United States Patent
McKinley et al.

(10) Patent No.: US 10,170,221 B2
(45) Date of Patent: Jan. 1, 2019

(54) FENCE STANDARD

(71) Applicant: GALLAGHER GROUP LIMITED, Hamilton (NZ)

(72) Inventors: Matthew Henry McKinley, Hamilton (NZ); Robert Andrew Wade, Hamilton (NZ)

(73) Assignee: GALLAGHER GROUP LIMITED, Hamilton (NZ)

( * ) Notice: Subject to any disclaimer, the term of this patent is extended or adjusted under 35 U.S.C. 154(b) by 151 days.

(21) Appl. No.: 14/389,460

(22) PCT Filed: Mar. 28, 2013

(86) PCT No.: PCT/NZ2013/000053
§ 371 (c)(1),
(2) Date: Sep. 30, 2014

(87) PCT Pub. No.: WO2013/147622
PCT Pub. Date: Oct. 3, 2013

(65) Prior Publication Data
US 2015/0060108 A1    Mar. 5, 2015

(30) Foreign Application Priority Data

Mar. 30, 2012 (NZ) .................................. 599142
Mar. 28, 2013 (NZ) .................................. 608769

(51) Int. Cl.
*A01K 3/00* (2006.01)
*H01B 17/14* (2006.01)
(Continued)

(52) U.S. Cl.
CPC ........... *H01B 17/145* (2013.01); *A01K 3/005* (2013.01); *E04H 17/12* (2013.01); *E04H 17/22* (2013.01);
(Continued)

(58) Field of Classification Search
CPC ........ A01K 3/005; E04H 17/12; E04H 17/22; H01B 17/145; H01B 19/00; Y10T 29/49227
(Continued)

(56) References Cited

U.S. PATENT DOCUMENTS 289,033 A * 11/1883 Shattuck .................. A01K 1/04
119/788
1,676,468 A * 7/1928 Waterman .............. A01G 9/122
47/47

(Continued)

FOREIGN PATENT DOCUMENTS

AU         2904267       4/1970
AU      2009201393      10/2009
(Continued)

OTHER PUBLICATIONS

International Search Report for PCT/NZ2013/000053 dated Aug. 14, 2014.

*Primary Examiner* — Amber R Anderson
*Assistant Examiner* — Nahid Amiri
(74) *Attorney, Agent, or Firm* — Greer, Burns & Crain, Ltd.

(57) ABSTRACT

A fence standard is provided and includes a shaft and a wire support including an open ended loop. The wire support is molded onto the shaft.

18 Claims, 5 Drawing Sheets

(51) Int. Cl.
*E04H 17/12* (2006.01)
*E04H 17/22* (2006.01)
*H01B 19/00* (2006.01)

(52) U.S. Cl.
CPC ........ *H01B 19/00* (2013.01); *Y10T 29/49227* (2015.01)

(58) Field of Classification Search
USPC ............. 256/10; 174/161 F, 163 F, 45 R; 114/140 R; 405/26; 49/59
See application file for complete search history.

(56) References Cited

U.S. PATENT DOCUMENTS

| | | | |
|---|---|---|---|
| 2,100,864 A | 11/1937 | Mansur | |
| 2,264,493 A * | 12/1941 | Werning | H01B 17/145 174/158 F |
| 2,791,625 A * | 5/1957 | Swanson | H01B 17/145 174/158 F |
| 2,899,173 A * | 8/1959 | Penland, Jr. | H01B 17/145 174/158 F |
| 2,899,487 A | 8/1959 | Drake | |
| 3,001,765 A * | 9/1961 | Shobert | H01B 17/145 174/158 F |
| 3,250,517 A | 6/1963 | Bramley | |
| 3,370,834 A | 2/1968 | Reznicek | |
| 3,531,090 A * | 9/1970 | Laible | A01K 3/005 174/161 F |
| 4,225,205 A * | 9/1980 | Sinclair | H01R 12/777 439/467 |
| 4,470,579 A * | 9/1984 | Aho | A01K 3/005 174/161 F |
| 4,692,567 A | 9/1987 | Crum | |
| 5,868,631 A * | 2/1999 | Palonen | A63B 53/14 473/203 |
| 5,947,836 A | 9/1999 | Murphy et al. | |
| 6,131,885 A | 10/2000 | Berg et al. | |
| D522,906 S * | 6/2006 | Siggins | A63B 53/14 D11/87 |
| 7,621,927 B2 * | 11/2009 | Messerly | A61B 17/1285 606/139 |
| 7,955,354 B2 * | 6/2011 | Figulla | A61B 17/0057 606/213 |
| 8,562,450 B2 * | 10/2013 | Gormley | A63B 43/007 473/146 |
| 8,715,205 B2 * | 5/2014 | Carter | A61M 25/09 600/585 |
| 2009/0250673 A1 * | 10/2009 | Menzel | E04H 12/2215 256/10 |

FOREIGN PATENT DOCUMENTS

| | | |
|---|---|---|
| EP | 0749686 | 12/1996 |
| EP | 1541018 | 11/2004 |
| EP | 1566818 | 8/2005 |
| FR | 2638060 | 4/1990 |
| GB | 653428 | 5/1951 |
| GB | 787671 | 12/1957 |
| GB | 852801 | 11/1960 |
| GB | 1016302 | 1/1966 |
| NZ | 168259 | 8/1972 |
| NZ | 323477 | 11/1995 |
| NZ | 516575 | 1/2003 |
| WO | 03/012316 A1 | 2/2003 |

* cited by examiner

FENCE STANDARD

STATEMENT OF CORRESPONDING APPLICATIONS

This application is based on the Provisional specification filed in relation to New Zealand Patent Application Number 599142, and the Complete specification filed in relation to New Zealand Patent Application Number 608769, the entire contents of which are incorporated herein by reference.

BACKGROUND

The present invention relates to a fence standard. The invention has particular application to a fence standard for use with electrical fencing line.

Throughout the specification, discussion of the present invention will be made with reference to electrified fencing systems. However, it should be appreciated that many of the principles discussed may also be applied to aspects of non-electrified fencing systems, and the reference to electrified fencing systems should not be seen to be limiting.

Portable electric fencing is an important aspect of livestock and pasture management. It is often used for the purpose of animal containment to ensure that livestock do not graze in an undesired area, or to set up temporary enclosures for animals to prevent the animals from extensive roaming. Controlling the area of pasture grazed by livestock is an important element of sustainable farm practice, where managing pasture growth assists in maximising food supplies and reducing the amount of supplementary feed required.

On a regular basis, a farmer will partition off sections of the pasture to exclude or contain livestock in order to permit pasture to recover from grazing activity. Portable electric fencing systems allow this to be achieved relatively easily.

A portable electric fence consists of three key components; a conductive wire, an energiser, and one or more fence posts to carry the wire. The energiser is a source of power for supplying an electric current to the wire. To energise a portable electric fence, a farmer will typically use a portable energiser, although a portable electric fence can also be powered via connection to a nearby permanent electric fence. An animal or person coming into contact with the wire will receive an electric shock.

The fence posts support the electric wire along its length to hold it in an elevated position above the ground. Typically, pigtail fencing standards are used for this purpose in portable electric fencing systems, as these are relatively lightweight and are generally considered simple to transport and install. FIG. 1 shows a prior art pigtail fencing standard (generally indicated by arrow 1). The standard 1 includes a metal rod 2, which is twisted in a coil 3 at one end. The coil 3 is covered in a plastic sheath 4. The coil 3 carries an electric wire 5 and acts as an insulator so that contact with the standard 1 will not result in an electric shock or shorting to ground.

In operation, as the wire 5 is pulled though the coil 3 it wears against the plastic sheath 4. Eventually this contacts the metal rod 2 beneath the sheath 4 which shorts out the electric fence.

U.S. Pat. No. 2,899,487 discloses an insulator coil made of bent thermoplastic tubing which is subsequently attached to a metal stand. While such a structure may not short the fence in the case of the wire wearing through the insulator, wearing though a wall of the tube would create a significant mechanical weakness. Further, the need to bend the tubing to form the insulator limits the range of materials useful for its manufacture.

The traditional pigtail arrangement also has a number of usability issues. For example, the open end of the coil (see tail 6 of FIG. 1) catches on wires, and tangles with other standards during storage and transportation. Further, the angle between the sections of coil 3 where it bends back over (see point 7 of FIG. 1) creates another point on which objects may become caught.

U.S. Pat. No. 4,470,579 discloses a post in which insulator clips are moulded directly to the shaft of the post. However, while the traditional pigtail coil has usability issues, it is a generally elegant solution which farmers are familiar with using. As such, it is seen as desirable to refine and/or improve the pigtail design rather than replacing it with another type of wire support.

Referring to FIG. 1, the standard 1 typically includes a foot 8 which may be used by the user as a footrest to drive the standard 1 into the ground, and act as a stabiliser. This bent rod foot 8 is typically welded or crimped to the rod 2. Carrying this out, as well as the need to manufacture the foot separately, adds additional steps to the manufacturing process—adding complexity, time, and therefore cost.

The typical hooked shape of the foot 8 also adds an additional point at which the standard 1 may become tangled with other standards. This can be exaggerated by the foot becoming bent during use—particularly when attempting to drive the standard 1 into hard ground.

U.S. Pat. No. 4,470,579 also discloses a foot press having blades which cut into the ground, and act as fins to provide stability. Such blades would be less likely to tangle with other standards than foot 8 of FIG. 1. However, one common use of the foot of fence standards is to hold a fence wire down close to the ground to create a gateway for the passage of a vehicle or stock. The blades are unsuited to such a task—they are more likely to cause damage to the wire than retain it in position.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Further aspects and advantages of the present invention will become apparent from the ensuing description which is given by way of example only.

SUMMARY

According to one aspect of the present invention there is provided a method of manufacturing a fence standard having at least two components including a shaft and a wire support including an open ended loop, the method including the step of:

a) moulding the wire support to the shaft.

According to another aspect of the present invention there is provided a fence standard including:

a shaft; and a wire support including an open ended loop, characterised in that the wire support is moulded onto the shaft.

Reference to a fence standard should be understood to be any means by which a wire is supported or held in a desired position, particularly relative to the ground. In a particularly preferred embodiment a fence standard is self supporting, and able to be easily relocated.

Reference to a wire support should be understood to mean a member configured to support or otherwise retain a fencing wire. It should be appreciated that reference to fencing wire is not intended to be limited to a drawn out thread of metal, and that the wire support may be used to support other types of fencing components—for example polytape, braid, or rope.

Reference to a loop should be understood to mean a shape produced by a length of material bending around to double onto or cross over itself. An open ended loop is one in which an end of the length of material does not join to the remainder of its length—creating a gap between the opposing sections of the loop through which a wire may be passed into the centre of the loop.

Such a loop may provide a mechanically simple means for retaining a wire, the operation of which may be familiar to users of traditional pigtail style fencing standards. Exemplary embodiments of the loop will be discussed further below.

Preferably the wire support is made of an electrically non-conducting material.

In a preferred embodiment the wire support is made of glass filled nylon. It is considered that this material has properties which are particularly suited to the function of a wire support—for example a high abrasion resistance in order to withstand wear due to drawing of fence wire through the support as it is wound onto a reel, and also having sufficient structural and impact strength to endure the physical and thermal shocks typical in a farming environment.

It should be appreciated that other electrically non-conductive materials known to those skilled in the art may be used in place of, or together with, glass filled nylon—for example a fibre filled polyolefin, polyethylene, or polypropylene material.

It should further be appreciated that this is not intended to be limiting, and that the wire support may be made of an electrically conducting material. Where electrical insulation between the wire and the ground is desired, this may be achieved using one or more intermediate insulating components.

Reference to moulding should be understood to mean a process of manufacturing by shaping pliable raw material using a rigid frame—in particular by inserting liquid or molten material into a mould where it hardens or sets to adopt the shape of the mould.

Preferably the wire support is injection moulded. However, it should be appreciated that other forms of moulding known to a person skilled in the art may also be applied to the present invention.

It is envisaged that moulding may permit the manufacture of wire supports using materials previously not contemplated in the art. This is considered to be particularly applicable to wire supports utilising an open ended loop, where previously manufacture required bending of the plastic, or metal shaft. Such previous designs traded abrasive resistance or hardness for the flexibility necessary for manufacture.

Further, by moulding the wire support directly onto the shaft an intimate connection between the shaft and wire support may be formed—assisting in preventing rotation or other movement of the components relative to each other. Also, the number of steps in the manufacturing process may be minimised, for example removing the need to store and transport the wire supports prior to attaching to the shafts.

Preferably the wire support, and in particular the loop, is made of solid material. It is envisaged that this may improve rigidity and mechanical strength, and thus resistance to damage in the physically harsh conditions in which the fence standards are intended to be used. Further, a solid wire support will be less likely to have its structural integrity compromised by wear of the wire against it—or at the very least have a longer life span than a tubular structure.

It should be appreciated that the wire support may include hollowing features in order to reduce the volume of material required. It is envisaged that these may be incorporated into the sections of the wire support moulded to the shaft.

Preferably the entire cross-section of the open ended loop is electrically isolated from the shaft. In doing so, even if wear occurs the wire will not be shorted out as with traditional pigtail standards. This may be achieved, for example, by moulding the loop out of solid, non-conductive material as discussed above.

As another way of assisting in reducing the likelihood of the wire being shorted as the result of wear, the open ended loop may extend beyond an end of the shaft to which the wire support is moulded. As the shaft presents the greatest risk of shorting, having the loop extend from the end of the shaft helps to ensure that the two components are isolated.

It is also envisaged that moulding the wire support may assist in the use of alternative configurations and shapes of wire supports not previously contemplated in the art. This may enable a manufacturer to tailor the appearance of the wire support to align with a common design theme, or at least provide a more aesthetically unique appearance. Further, such configurations may provide advantages with regard to usability of the standard—particularly reducing the likelihood of fence standards becoming tangled with each other.

For example, in a preferred embodiment the open ended loop is substantially centred about a longitudinal axis of the shaft.

One of the issues with the traditional pigtail fence standard is that the coil extends sideways from the shaft as the result of the manufacturing process, which together with the gap creates a lip. This lip can catch on objects—particularly other standards—during storage and transportation, leading to tangling of the standards.

Centering the loop relative to the shaft may help to reduce this lip, making the wire support less likely to catch on objects such as other standards.

According to another aspect of the present invention there is provided a wire support including:

an open ended loop having at least two opposing sections, characterised in that the loop has a non-uniform thickness such that the thickness of at least one of the opposing sections is less than the greatest thickness of the loop.

Reference to thickness of the loop should be understood to mean the cross-sectional dimension through opposing surfaces of the length of the material forming the loop, along the axis about which the loop turns.

One of the issues with the traditional pigtail fence standard is that the coil extends sideways from the shaft as the result of the manufacturing process, which together with the gap creates a lip. This lip can catch on objects—particularly other standards—during storage and transportation, leading to tangling of the standards.

By reducing the thickness of the loop at the opposing sections, it is envisaged that the overall dimensions of the wire support may be reduced while still meeting strength requirements as well as usability in terms of the size of the gap allowing passage of the wire.

Further, this may assist in maintaining an overall shape of the wire support. Containing the opposing sections within a visually consistent profile may assist in making the wire support less prone to catching on objects in its surrounding environment, and thus be more readily transported and installed.

In a preferred embodiment the thickness of a central portion of the loop between the opposing sections is greater than that of the opposing sections. In a further preferred embodiment, the loop includes sloped transition portions between the opposing sections and the central portion.

This may act as a guide for the wire through the gap, improving the ease with which the wire may be positioned within, or removed from, the loop.

While it is envisaged that moulding processes may be particularly suited to producing the loop with non-uniform thickness, this is not intended to be limiting and other manufacturing processes may be used.

In one embodiment the opposing sections of the loop may have a complementary shape. For example, at least one surface of the opposing sections may be substantially planar.

According to another aspect of the present invention there is provided a wire support including:
    an open ended loop having at least two opposing sections,
        each opposing section including a surface facing the other section,
characterised in that
    at least one of the surfaces is substantially planar.

Reference to the surface being substantially planar should be understood to mean that the majority of the surface lies within a two dimensional plane. It should be appreciated that the planar surface may be a section of the wire support's surface rather than its entirety.

It is envisaged that such a planar surface may be useful in guiding the wire across the gap between the opposing sections.

In another embodiment, it is envisaged that the opposing sections may be shaped to encourage or discourage passage of the wire between the sections. For example, the opposing sections may be shaped to funnel the wire between them in one direction, or both.

Preferably one of the opposing sections includes an end of the loop, and the end falls within the outer periphery of the other opposing section of the loop.

According to another aspect of the present invention there is provided a wire support including:
    an open ended loop having at least two opposing sections,
        wherein one of the opposing sections includes an end of the loop,
characterised in that
    the end lies within the outer periphery of the other opposing section of the loop.

Traditional coils used in fence standards typically have their free end projecting from the circular shape of the coil. This "tail" can cause the standard to become tangled with both the wire and also other standards during storage and transportation.

By ensuring that the end of the loop of the present invention does not extend beyond the outer periphery of an opposing section, the shape of the wire support around its edge is substantially contained. As a result, the chance of it catching on objects and becoming tangled is reduced.

In a preferred embodiment the end of the loop is rounded. It is envisaged that this may further assist in reducing the likelihood of objects becoming caught on the wire support—particularly the wire as it is passing through the gap.

According to another aspect of the present invention there is provided a wire support including:
    an open ended loop having at least two opposing sections forming a gap; and
    an elongate member extending from one of the opposing sections,
characterised in that
    the member includes a sloped transition surface leading to the gap.

It is common practice for farmers to insert a fence standard underneath a fence wire, and drag the wire along the shaft to the pigtail coil (in the case of electrified fences ensuring that the wire remains on the insulated covering at the top of the shaft). The wire is guided into the gap between the coils, and the shaft twisted to position the wire within the centre of the coil. It may be desirable to maintain and improve on the ability to perform this operation using the present invention.

The elongate member preferably provides the point of connection to the shaft. The sloped transition assists in guiding the wire down to the gap between the opposing sections, when picked up using the method described above.

In a preferred embodiment, the sloped transition surface is substantially planar. More preferably, the sloped transition surface connects to the substantially planar surface of the opposing section from which the elongate member extends. In doing so, the wire is correctly oriented for entry into the gap—improving the fluidity of motion in performing the operation.

According to another aspect of the present invention there is provided a fence standard including a wire support as substantially described above, and a shaft. The wire support may be moulded to the shaft as previously described.

Preferably the fence standard includes a ground engaging member.

The ground engaging member is configured to provide stability to the fence standard and maintain it in the desired orientation. For example, the ground engaging member may be a weighted base or a foot attached to the shaft.

In a preferred embodiment the ground engaging member includes a blade having a downwards facing edge extending laterally from the shaft. The use of a blade rather than traditional secondary spike may assist in reducing the likelihood of the standard becoming tangled, via the elimination or at least reduction in size of catching points. However, it should be appreciated that reference to the ground engaging member including a blade is not intended to be limiting; the ground engaging member may take any number of other forms known to a person skilled in the art—for example a secondary spike in parallel with the shaft.

Preferably the blade substantially lies in the same plane as the loop of the wire support. In doing so, fence standards may be more easily stacked or held against each other in a tidy fashion.

It is envisaged that the ground engaging member may include a portion moulded directly to the shaft. More preferably the ground engaging portion is moulded to the shaft such that a portion of the shaft extends below the ground engaging member.

According to another aspect of the present invention there is provided a fence standard including:
 a shaft; and
 a ground engaging member,
characterised in that
 the ground engaging member is moulded to the shaft such that a portion of the shaft extends below the ground engaging member.

The standard may include a wire support substantially as described above.

In a preferred embodiment the ground engaging member includes a downwards facing recess configured to receive a wire. As discussed in the background art section, one common use of the foot of traditional fence standards is to hold a fence wire down close to the ground to create a gateway in the fence for the passage of vehicles or stock. However, previously known foot presses using blades are unsuited for this purpose. Firstly, the blade is typically angled to assist with insertion into the ground and the wire cannot gain purchase along its length. Further, the blade carries a high risk of damaging the wire when forced down onto it—requiring replacement or repair of the wire which carries costs with regard to both material and labour resources.

According to another aspect of the present invention there is provided a ground engaging member for use with a fence standard including:
 a body configured to be connected to a shaft of a fence standard;
 a foot press extending laterally from the body; and
 a protrusion extending away from the body and the foot press,
characterised in that
 the protrusion includes a downwards facing recess located in a protrusion.

It is envisaged that this embodiment may have particular application to the foot press including a blade having a downwards facing blade—the downwards facing recess acting as a hook to allow capture of a wire and hold it to, or close to, the ground using a fence standard. However, it should be appreciated that this is not intended to be limiting.

In a preferred embodiment the ground engaging member includes a sloped transition surface leading to the downwards facing recess.

It is envisaged that farmers may locate the wire in the recess using a similar technique to that described in relation to the sloped transition surface leading to the gap in the wire support. Resting the fence standard on top of the wire with the recess facing the wire, the standard may be pushed forward, running the wire up the sloped transition surface of the ground engaging member to be captured in the recess. The fence standard could then be pivoted upright, and the ground engaging member used to secure the fence standard in place—holding the wire at a lower elevation.

It is also envisaged that the ground engaging member includes a sloped transition surface leading away from the downwards facing recess. This may assist in reducing the likelihood of objects catching on the protrusion, for reasons previously discussed.

According to another aspect of the present invention there is provided a ground engaging member for use with a fence standard including:
 a blade having a downwards facing edge,
characterised in that
 the downwards facing edge includes a recess configured to receive a wire.

It is envisaged that such an arrangement may enable a farmer to use a technique for capturing the wire similar to that describe above, while reducing the likelihood of the wire being damaged in comparison with the prior art. While the wire may run along the edge of the blade in doing so, the real risk of damaging the wire is not introduced until the wire is trapped between the edge and the ground. The recess in the blade prevents this from occurring.

A shaft should be understood to mean any elongate member configured to support or otherwise connect the wire support relative to a desired support surface. For example the shaft may be intended to provide a vertical support relative to the ground, or a horizontal support connecting the wire support to a strainer post.

Preferably the shaft is made of an electrically conductive material—for example metal rod.

However, this is not intended to be limiting, as the shaft may be made of effectively any electrical conductive or non-conductive material according to the desired application.

Preferably an electrically conductive material is an electrically conductive metal or metal alloy such as stainless or galvanised steel. However, persons skilled in the art will appreciate that other electrically conductive metals or materials may be used to manufacture the present invention. For example, carbon black is an electrically conductive material which may be suitable for use in the present invention.

In a preferred embodiment the shaft is substantially straight along its length.

Prior art fence standards typically require processing—particularly bending—of the shaft to produce the shape of the wire support. Reducing this processing may reduce the cost of manufacture, and help to produce a shaft with less stress points to improve its robustness.

Further, where the shaft is made of metal consideration should be made with regard to corrosion resistance. A cost effective method of achieving this is to apply a thin coating of alternative material to the shaft in order to improve its resistance to corrosion or oxidation of the main shaft material. This coating may be damaged during processing of the shaft while manufacturing prior art fence standards. This damage may be reduced as a result of minimising processing of the shaft, ultimately improving the useful life of the shaft.

It is envisaged that the shaft may include features for securing the wire support and/or ground engaging member to the shaft. For example the shaft may include an indexing deformation, such as a crimped portion or barb, over which the wire support is moulded. Preferably the securing feature is configured to prevent rotational or lateral movement of the wire support relative to the shaft.

The present invention may offer a number of advantages over the prior art, including:
 reduced complexity in manufacturing by eliminating the need to bend the metal rod into a coil;
 reduced weight by reducing the length of metal rod required per standard;

increasing useful lifespan by removing metal from the wire support in order to eliminate potential for shorting due to wearing of wire through the insulation;

greater strength and abrasion resistance through the use of materials enabled by moulding the wire support in the desired shape as opposed to mechanical manipulation;

maintaining a familiar method of operation while reducing the likelihood of entanglement—particularly by reducing the overhang of the open ended loop through centering the loop of the shaft axis and/or non-uniform thickness of the loop, and/or containing the end of the loop within its outer periphery, and improved aesthetics enabled though moulding of the wire support.

BRIEF DESCRIPTION OF THE DRAWINGS

Further aspects of the present invention will become apparent from the following description which is given by way of example only and with reference to the accompanying drawings in which.

DETAILED DESCRIPTION

Figure 1:
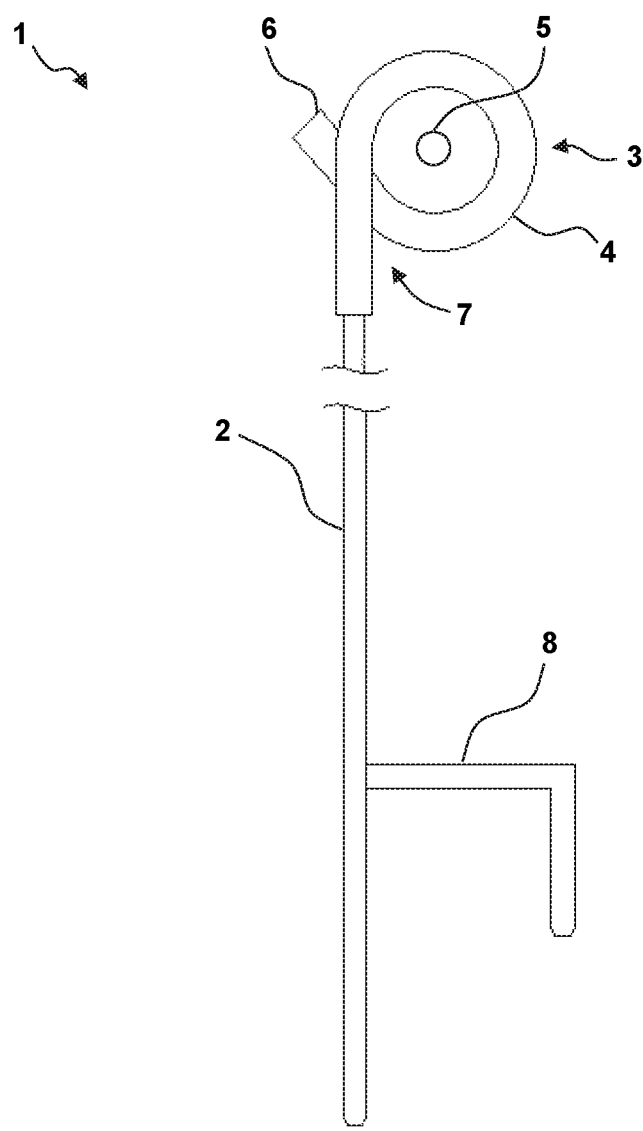
FIG. 1 provides a side view of a prior art fencing standard.
Figure 2:
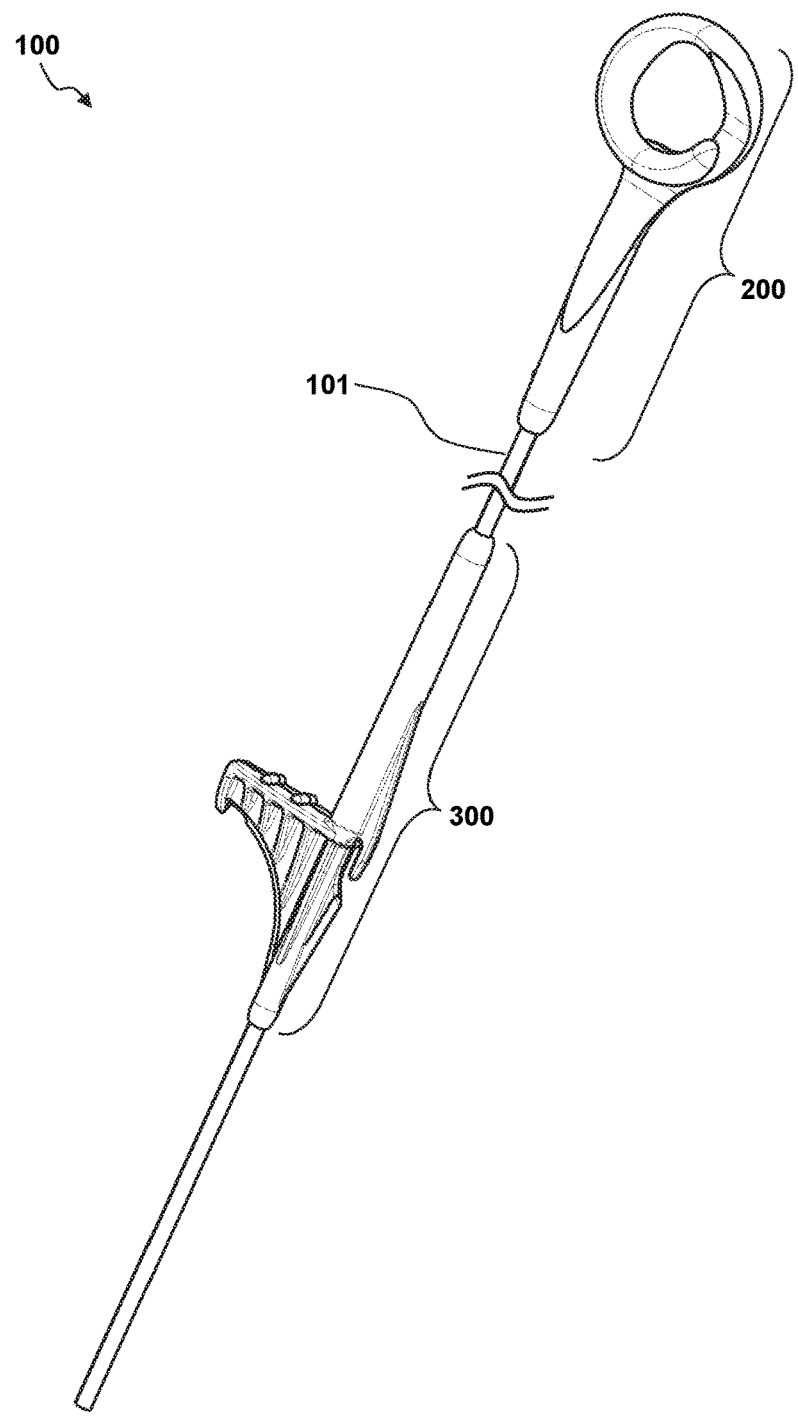
FIG. 2 is a perspective view of an exemplary fencing standard according to one aspect of the present invention.

FIG. 2 illustrates a fence standard (indicated by arrow 100) according to one aspect of the present invention, including a straight steel shaft 101 and a wire support 200 made of glass filled nylon, the shape of which is moulded in place onto the shaft 101. A ground engaging member in the form of foot 300 made of glass filled nylon is moulded to the shaft 101 in order to assist in driving the shaft 101 into the ground and providing lateral stabilisation for supporting standard 100 in an upright position and resisting twisting.

Figure 3A:
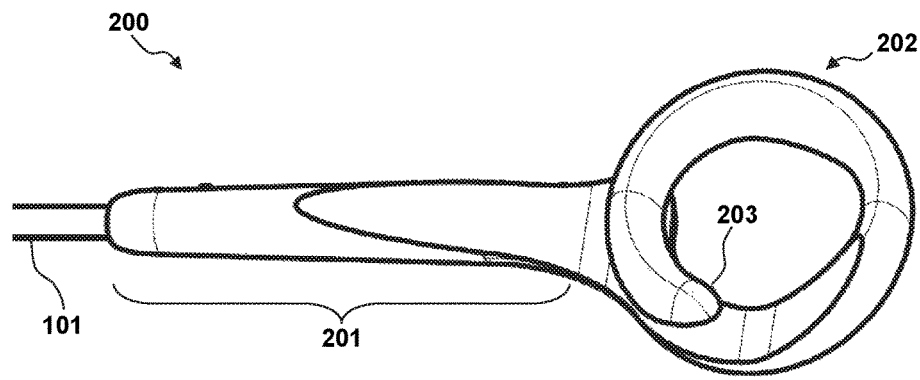
FIG. 3a is a perspective view of an exemplary wire support according to one embodiment of the present invention.

Referring to FIG. 3a, the wire support 200 includes an elongate support member 201 providing the point of connection between the wire support 200 and the shaft 101 illustrated in FIG. 2. An open ended loop 202 extends from the support member 201 (and thus beyond an end of the shaft 101). The loop 202 terminates with end 203. The entire length of the loop 202 is made of solid glass filled nylon, and is therefore electrically isolated from the shaft 101 through its cross-section.

Figure 3B:
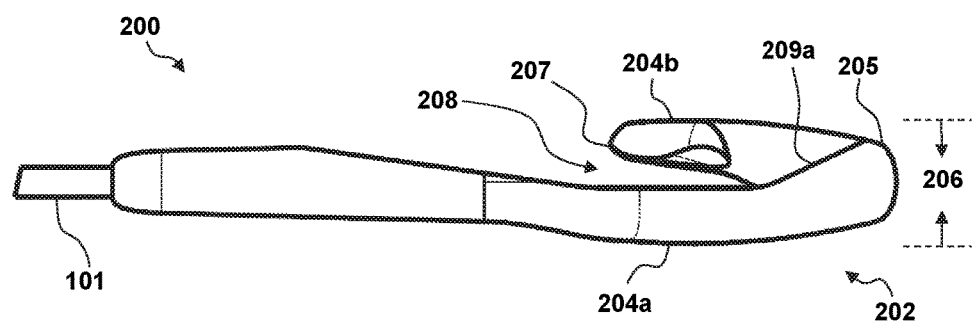
FIG. 3b is a side view of the wire support according to one embodiment of the present invention.

Referring to FIG. 3b, it may be seen that the thickness of the loop 202 is non-uniform along its length. In particular, the loop 202 includes two opposing sections 204a and 204b which overlap each other. The thickness of the opposing sections 204a and 204b is less than the greatest width of the loop 202 at central portion 205.

This enables the overall thickness 206 of the loop 202 to be kept compact to assist in improving the ease of stacking standards against each other, and reduce the size of the lip 207 created by the edge of section 204b on which objects may catch, while maintaining a suitable gap 208 enabling passage of a wire (not illustrated) in and out of the centre of the loop 202.

Further, increasing the thickness of the loop 202 at central portion 205 assists in improving the ergonomics of the wire support 200—providing a broader surface against which a user may push or pull to insert or remove the standard 100 from the ground.

The loop 202 includes sloped transition portions between the central portion 205 and the opposing sections 204a and 204b—for example sloped transition portion 209a. These act as a guide for the wire on exiting or entering the gap 208, improving the ease with which the wire may be positioned within, or removed from, the loop 202.

Figure 3C:
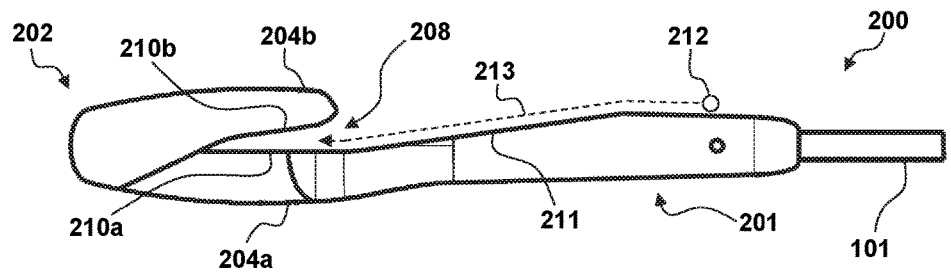
FIG. 3c is an opposing side view of the wire support according to one embodiment of the present invention.

Referring to FIG. 3c, opposing sections 204a and 204b each include surfaces 210a and 210b respectively, each facing the other section.

It may be seen that surface 210a is substantially planar. Further, the support member 201 includes a substantially planar sloped transition surface 211 leading to the surface 210a and into the gap 208.

This arrangement assists a user in positioning a wire 212 within the loop 202. The user holds the standard 100 (see FIG. 2) sideways, and inserts the wire support 200 beneath the wire 212. The user lifts the standard so the wire rests against the support member 201. By pulling the standard, the wire 212 is dragged along the line indicated by arrow 213—down the transition surface 211, onto surface 210a, and into the gap 208. The standard may then be rotated to bring the wire 212 out of alignment with the gap 208 and be captured within the loop 202.

The planar nature of the sloped transition surface 211 assists in aligning the wire 212 with the gap 208, reducing the likelihood of it catching on loop 202.

Figure 3D:
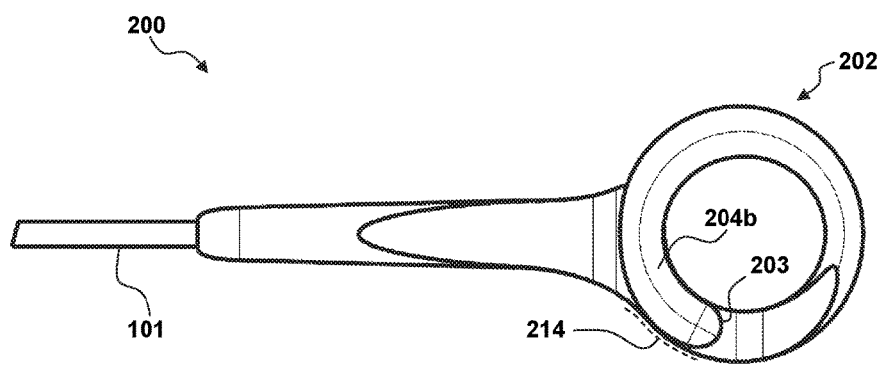
FIG. 3d is a face on view of the wire support according to one embodiment of the present invention.

Referring to FIG. 3d, it may be seen that the end 203 of the loop 202 falls within the outer periphery (indicated by dashed line 214) of the opposing section 204b (not clearly seen in FIG. 3d, but see FIG. 3c).

By doing so, the shape of the wire support 200 around its edge is substantially contained. As a result, the chance of it catching on objects and becoming tangled is reduced. In order to further assist in achieving this, the end 203 is rounded off.

Figure 3E:
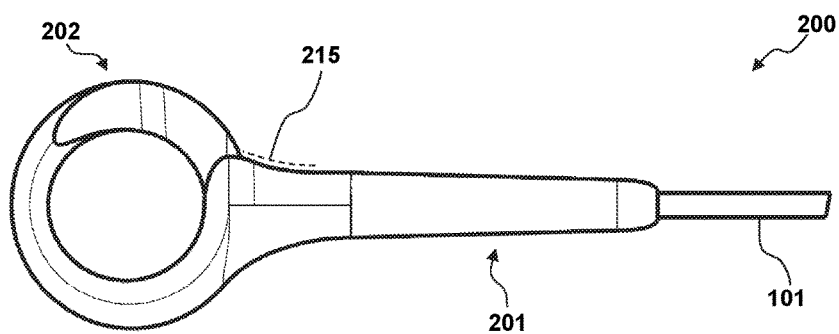
FIG. 3e is a view of the other face of the wire support according to one embodiment of the present invention.

Referring to FIG. 3e, it may be seen that the end of the support member 201 includes a curved edge 215 leading outwardly towards the edge of the loop 202. In doing so, objects are less likely to become caught at the point where the loop 202 crosses itself. Instead, a relatively smooth transition is created which objects brush past.

From FIG. 3b, FIG. 3c, FIG. 3d, and FIG. 3e it may be seen that the loop 202 is substantially centred about a longitudinal axis of the shaft 101. This helps in reducing the overhang of the edges of the loop 202 beyond the central axis of the shaft 101, thereby reducing the likelihood of the wire support 200 becoming caught on or entangled with other objects.

Figure 4:
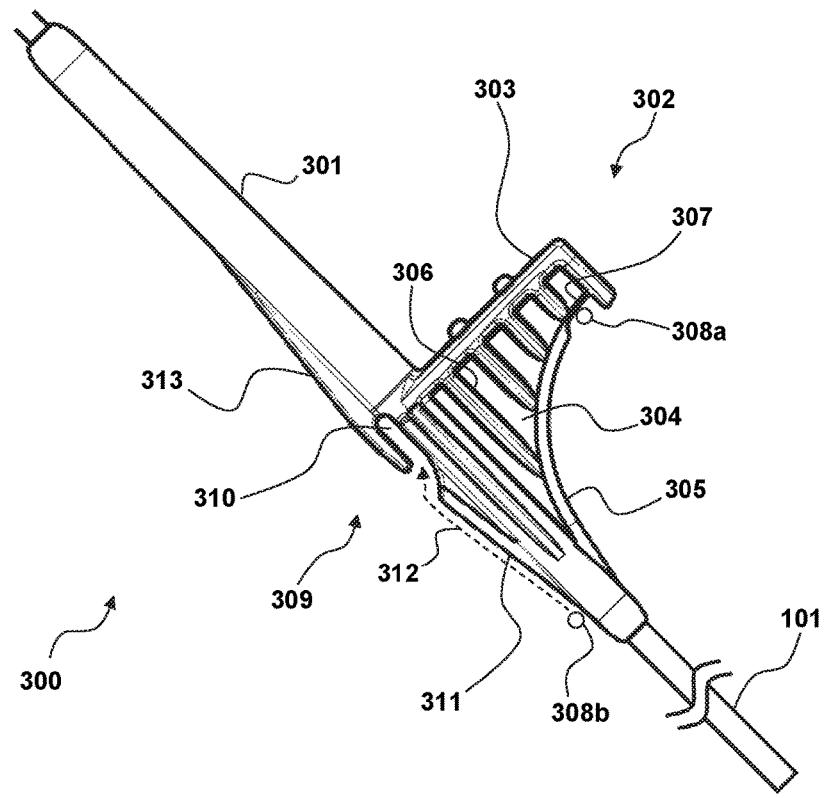
FIG. 4 is a face on view of an exemplary ground engaging member according to one embodiment of the present invention.

Referring to FIG. 4, the foot 300 is moulded to the shaft 101 such that a portion of the shaft 101 extends below it.

The foot 300 includes a body 301 which surrounds the shaft 301. A foot press 302 extends laterally from the body 301, with the top side 303 of the foot press 302 providing a surface to which a user may apply force to drive the fence standard (see standard 100 of FIG. 2) into the ground.

A blade 304 having a curved downwards facing edge 305 extends from the foot press 302. The blade 304 includes ridges 306 to provide reinforcement. The blade 304 provides stability when inserted into the ground—increasing the surface area of the standard in the ground to keep it upright and also resisting twisting.

The blade 304 also includes a downwards facing recess 307 in the edge 305. The recess 307 may be used to catch a fence wire 308a and hold it in position while the standard is inserted into the ground.

This may be repeated at a spaced interval along the fence line to create a gateway in the fence for the passage of vehicles or stock, while the remainder of the fence line remains at an elevated position.

The foot 300 also includes a protrusion 309 extending from the other side of body 301 from the foot press. The protrusion 309 includes a generally downwards facing recess 310.

The protrusion 309 includes a sloped transition surface 311 leading to the downwards facing recess 310. It is envisaged that a user may locate wire 308b in the recess 310 using a similar technique to that described in relation to the FIG. 3c.

The user rests the shaft 101 or body 301 on top of the wire 308b with the recess 310 facing the wire 308b. The foot 300 is pushed forward, running the wire 308b up the sloped transition surface 311 in the direction indicated by dashed arrow 312 to be captured in the recess 310. The fence standard (see standard 100 of FIG. 2) is then pivoted upright, and the foot 300 used to secure it in place—holding the wire 308b at a lower elevation.

The protrusion 309 also includes a rear sloped transition surface 313 leading away from the recess 310. This may be used to locate the wire 308b in the recess 310 by first dragging the wire 308b up the slope 313 before pushing the foot 300 forward to capture it.

Figure 5:
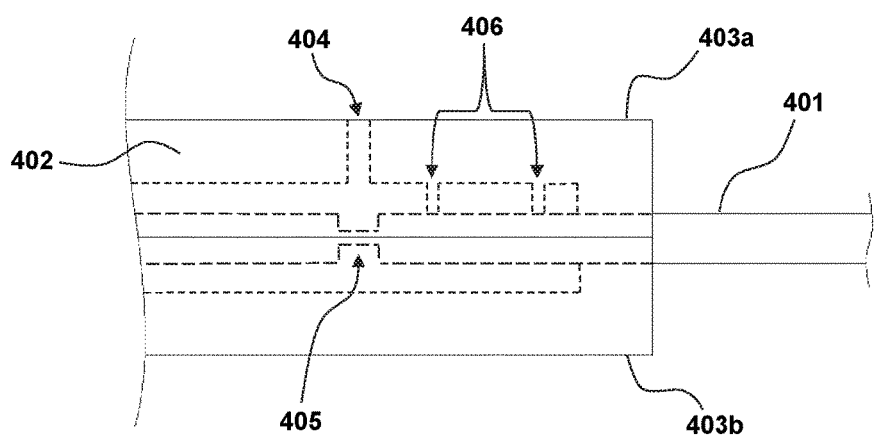
FIG. 5 illustrates manufacture of a fencing standard according to one aspect of the present invention.

FIG. 5 illustrates the manufacture of a fence standard.

The process will be described with reference to moulding of a wire support (for example wire support 200) to a shaft (for example shaft 101). However, it should be appreciated that a similar process may use used—whether simultaneously or separately—to mould a ground engaging member (for example foot 300) to the shaft.

Referring to FIG. 5, a shaft 401 is positioned within a cavity 402 between a first die portion 403a and a second die portion 403b. Molten glass-filled nylon is injected into the cavity 402 through nozzle 404. The shaft 401 includes a crimped portion 405 around which the molten glass-filled nylon flows.

Pins 406 in the first die portion 403a assist in holding the shaft 401 in place while the moulding operation takes place.

Once the glass filled nylon has set, the shaft 301 and newly moulded wire support (not illustrated) may be removed as a single unit.

Aspects of the present invention have been described by way of example only and it should be appreciated that modifications and additions may be made thereto without departing from the scope thereof as defined in the appended claims.

What we claim is:

1. A fence standard, comprising:
    an elongate shaft; and
    a wire support made of electrically non-conductive material, comprising:
        an elongate support member including a first end and a second end, and a longitudinal axis between the first end and the second end; and
        an open ended loop made of a length of material bending around to double onto or cross over itself and result in overlapping opposing sections having a gap therebetween to permit passage of a wire into the center of the loop in use, wherein one of the opposing sections includes an end of the loop, and the end of the loop lies within an outer periphery of the other opposing section of the loop,
        wherein the length of material forming the open ended loop extends from the first end of the elongate support member in a first direction away from the longitudinal axis before bending around above the first end, and
        wherein the elongate support member includes a guide surface facing away from the first direction, the guide surface leading outwardly from the longitudinal axis along a direction from the second end to the first end,
        wherein the wire support is connected to the shaft by the elongate support member.

2. The fence standard of claim 1, wherein the loop has a non-uniform thickness such that the thickness of at least one of the opposing sections is less than the greatest thickness of the loop.

3. The fence standard of claim 2, wherein the loop comprises a central portion between the opposing sections, and the thickness of the central portion is greater than that of the opposing sections.

4. The fence standard of claim 3, wherein the loop comprises sloped transition portions between the opposing sections and the central portion.

5. The fence standard of claim 1, wherein each opposing section comprises a surface facing the other section, and at least one of the surfaces facing the other section is substantially planar.

6. The fence standard of claim 1, wherein one of the opposing sections comprises an end of the loop, and the end lies within the outer periphery of the other opposing section of the loop.

7. The fence standard of claim 1, wherein the elongate support member comprises a sloped transition surface leading to a gap between the opposing sections.

8. The fence standard of claim 7, wherein the sloped transition surface is substantially planar.

9. The fence standard of claim 1, wherein the open ended loop is substantially centered about a longitudinal axis of the shaft.

10. The fence standard of claim 1, wherein the wire support is made of glass filled nylon.

11. The fence standard of claim 1, comprising a ground engaging member moulded to the shaft such that a portion of the shaft extends below the ground engaging member.

12. The fence standard of claim 1, comprising a ground engaging member which comprises:
    a body configured to be connected to the shaft;
    a foot press extending laterally from the body; and
    a protrusion extending away from the body and the foot press, wherein the protrusion comprises a downwards facing recess.

13. The fence standard of claim 12, wherein the ground engaging member comprises a sloped transition surface leading to the downwards facing recess.

14. The fence standard of claim 12, wherein the ground engaging member comprises a sloped transition surface leading away from the downwards facing recess.

15. The fence standard of claim 1, comprising a ground engaging member, comprising a blade having a downwards facing edge, wherein the downwards facing edge comprises a recess configured to receive a wire.

16. A fence standard of claim 1, wherein the width of the elongate support member, between a first side on which the guide surface is located and a second side opposite to the first side, increases along at least a portion of the elongate support member in the direction from the second end to the first end.

17. The wire support of claim 1, wherein the width of the elongate support member, between a first side on which the guide surface is located and a second side opposite to the first side, increases along at least a portion of the elongate support member in the direction from the second end to the first end.

18. A wire support made of electrically non-conductive material, including:

an elongate support member including a first end and a second end, and a longitudinal axis between them, and an open ended loop made of a length of material bending around to double onto or cross over itself resulting in opposing sections having a gap between them to permit passage of a wire into the centre of the loop in use, wherein one of the opposing sections includes an end of the loop, and the end of the loop lies within an outer periphery of the other opposing section of the loop, wherein the length of material forming the open ended loop extends from the first end of the elongate support member in a first direction away from the longitudinal axis before bending around above the first end, and wherein the elongate support member includes a guide surface facing away from the first direction, the guide surface leading outwardly from the longitudinal axis along a direction from the second end to the first end.

\* \* \* \* \*